(12) United States Patent
Das

(10) Patent No.: US 6,992,985 B1
(45) Date of Patent: Jan. 31, 2006

(54) METHOD AND SYSTEM FOR AUTO DISCOVERY OF IP-BASED NETWORK ELEMENTS

(75) Inventor: Debashis Das, Billerica, MA (US)

(73) Assignee: Nokia Inc., Irving, TX (US)

( * ) Notice: Subject to any disclaimer, the term of this patent is extended or adjusted under 35 U.S.C. 154(b) by 957 days.

(21) Appl. No.: 09/895,357

(22) Filed: Jun. 29, 2001

(51) Int. Cl.
*H04L 12/28* (2006.01)

(52) U.S. Cl. ............... 370/252; 370/254; 370/390; 370/432; 370/503

(58) Field of Classification Search ............ 370/241.1, 370/242, 244, 252, 254, 390, 432, 503, 510
See application file for complete search history.

(56) References Cited

U.S. PATENT DOCUMENTS

| | | | |
|---|---|---|---|
| 5,282,270 A | 1/1994 | Oppenheimer et al. | ..... 709/223 |
| 5,315,580 A | 5/1994 | Phaal | ......... 370/232 |
| 5,619,615 A | 4/1997 | Pitchaikani et al. | .......... 706/10 |
| 5,878,420 A | 3/1999 | de la Salle | .................. 707/10 |
| 5,909,549 A | 6/1999 | Compliment et al. | ....... 709/223 |
| 6,182,157 B1 | 1/2001 | Schlener et al. | ............ 719/318 |
| 6,493,345 B1 * | 12/2002 | Margulis et al. | ....... 370/395.53 |
| 6,816,461 B1 * | 11/2004 | Scrandis et al. | ............ 370/242 |
| 2001/0033550 A1 * | 10/2001 | Banwell et al. | ............. 370/254 |
| 2002/0072362 A1 * | 6/2002 | Garland et al. | ............. 455/432 |

\* cited by examiner

*Primary Examiner*—Dang Ton
*Assistant Examiner*—Shick Hom
(74) *Attorney, Agent, or Firm*—Banner & Witcoff

(57) ABSTRACT

A system and method for discovering network elements are disclosed where each network element includes a multicast packet sender for issuing a multicast packet addressed to a unique group, including a local register host, located in a common subnet. A packet analyzer in the local register host determines the identification of the issuing network element for comparison with entries in a local register host device table. The device table is continually synchronized with a master device table resident in a central management station by either adding a new entry in the master device table if the issuing network element has come 'online' or by deleting an existing entry for a network element which has not issued a multicast packet within a specified time.

23 Claims, 7 Drawing Sheets

METHOD AND SYSTEM FOR AUTO DISCOVERY OF IP-BASED NETWORK ELEMENTS

FIELD OF THE INVENTION

This invention relates to network communication systems and, in particular, to a system and method for discovering network elements.

BACKGROUND OF THE INVENTION

In the present state of the art, a conventional network management system may use a Internet Control Message Protocol (ICMP) Packet Internet Groper (PING) utility for performing auto-discovery of network elements. This method is not an efficient process because unnecessary traffic is introduced to the entire network when the network management station periodically transmits messages to all network elements in all the subnets.

Other conventional methods, such as SNMP trap-based discovery, require that the IP address of the network management station be known to the network elements. A shortcoming of such conventional methods is that, if a particular network element fails, the network management station has no means of detecting that the failure has occurred unless the management station polls the devices at specific intervals. In addition, the SNMP trap-based approach tends to be an inefficient method.

What is needed is an improved method for discovering network resources, and for automatically ascertaining when a particular network resource may have failed.

SUMMARY OF THE INVENTION

The present invention is based on IP multicasting where each network element to be discovered includes a multicast packet sender for generating multicast packets addressed to a multicast group by a local register host located in the same subnet and for listening to the multicast group. A packet analyzer in the local register host determines the identification of the issuing network element for comparison with entries in a local register host device table. The device table is continually synchronized with a master device table resident in a central management station by either adding a new entry in the master device table if the issuing network element has come 'online' or by deleting an existing entry for a network element which has not issued a multicast packet within a specified time.

Auto-discovery traffic is thus generated between the local registers and the central management station only if a particular network element comes 'online' or goes 'offline,' with other auto-discovery packets remaining within the originating subnet. The method of network element discovery disclosed herein minimizes traffic at startup and during normal operation, with no additional traffic being produced in a steady-state environment. Additionally, the method is scalable and provides for fault tolerance and robustness.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
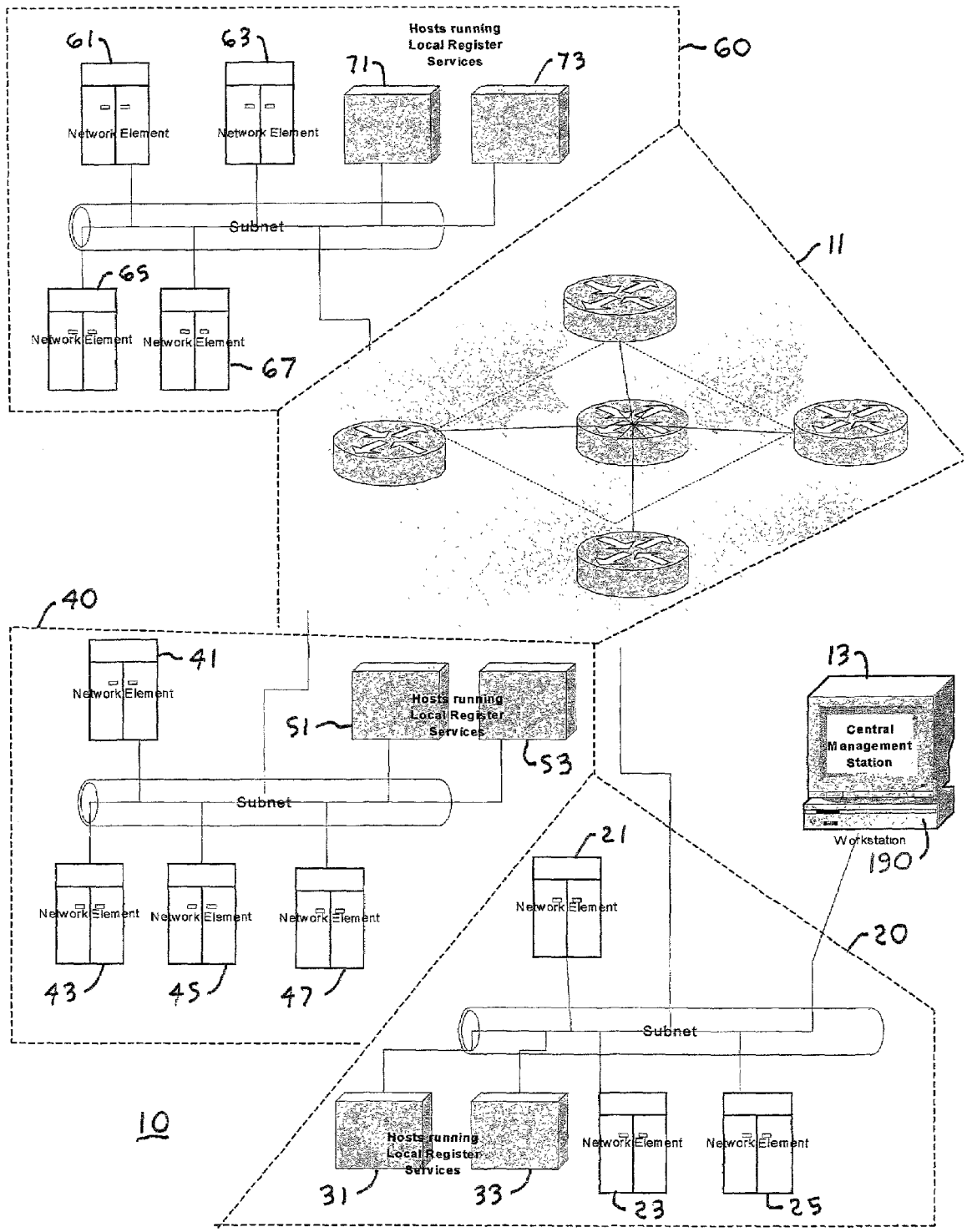
FIG. 1 is a diagrammatical representation of a network including a plurality of network elements monitored by a central management station communicating with local register hosts located in each subnet of the network.

There is shown in FIG. 1 an IP-based network 10 in which the method of the present invention can be advantageously employed. The network 10 includes a central management station 13 coupled to an IP-based communication network 11 via a first subnet 20. The subnet 20 includes a plurality of network elements to be discovered by the management station 13. These network elements are here represented by network elements 21, 23, and 25. Local register services are provided to the subnet 20 by one or more host servers, here represented by a first local register host 31 and an optional, second local register host 33. In a preferred embodiment, the second local register host 33 is used to provide redundancy or backup in the event of failure of the first local register host 31.

The communication network 11 may provide connection from the first subnet 20 to one or more other subnets, here represented by a second subnet 40 and an $n^{th}$ subnet 60. The subnet 40 includes a plurality of network elements 41, 43, 45, and 47, and local register hosts 51 and 53. The subnet 60 includes a plurality of network elements 61, 63, 65, and 67, and local register hosts 71 and 73. The central management station 13 includes a device discovery system 190, an application used in discovering the network elements 21–25, 41–47, and 61–67, as described in greater detail below.

Figure 2:
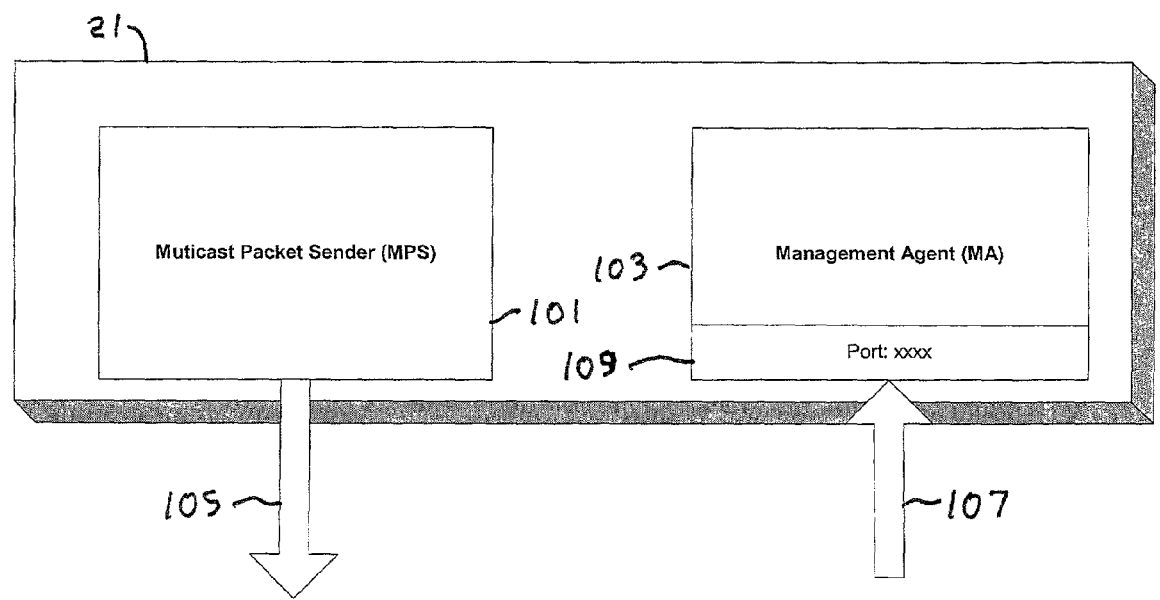
FIG. 2 is a functional block diagram of a network element including a multicast packet sender and a management agent used in communicating with a local register host of FIG. 1.

As can be seen with additional reference to FIG. 2, the network element 21 includes a multicast packet sender 101, and a management agent 103 which can be an SNMP or other custom lightweight agent. The network elements 23–25, 41–47, and 61–67 are similar to the network element 21 in that each includes a multicast packet sender and a management agent (not shown for clarity of illustration) to provide for management functions. All multicast packet senders and management agents in the network 10 function as described below for the multicast packet sender 101 and the management agent 103. The network element 21 runs a bootstrapped daemon process which periodically sends multicast packets 105, preferably transmitted using UDP/IP protocol, to a unique multicast group in the subnet 20 at configurable intervals. The local register host 31 listens to the multicast group in conjunction with the periodic multicasting. The configurable interval is bounded by a 'maximum lease time.' The recipients of the multicast packets 105 include the network elements 23 and 25 and the local register hosts 31 and 33.

The payload of the multicast packets 105 includes the device identification of the network element 21. The device identification preferably includes the IP address of the network element 21 and the port number of a communication port 109 at which the network element 21 will accept unicast connections. As can be appreciated by one skilled in the relevant art, the management agent 103 runs on the network element 21 and functions as a server by listening at the port number published in the multicast packet 105. It is the responsibility of the management agent 103 to provide further information about the network element 21 when receiving a query 107 from the local register host 31. If the device identification is not initially known, a value of 'null' is assigned to the network element 21.

Figure 3:
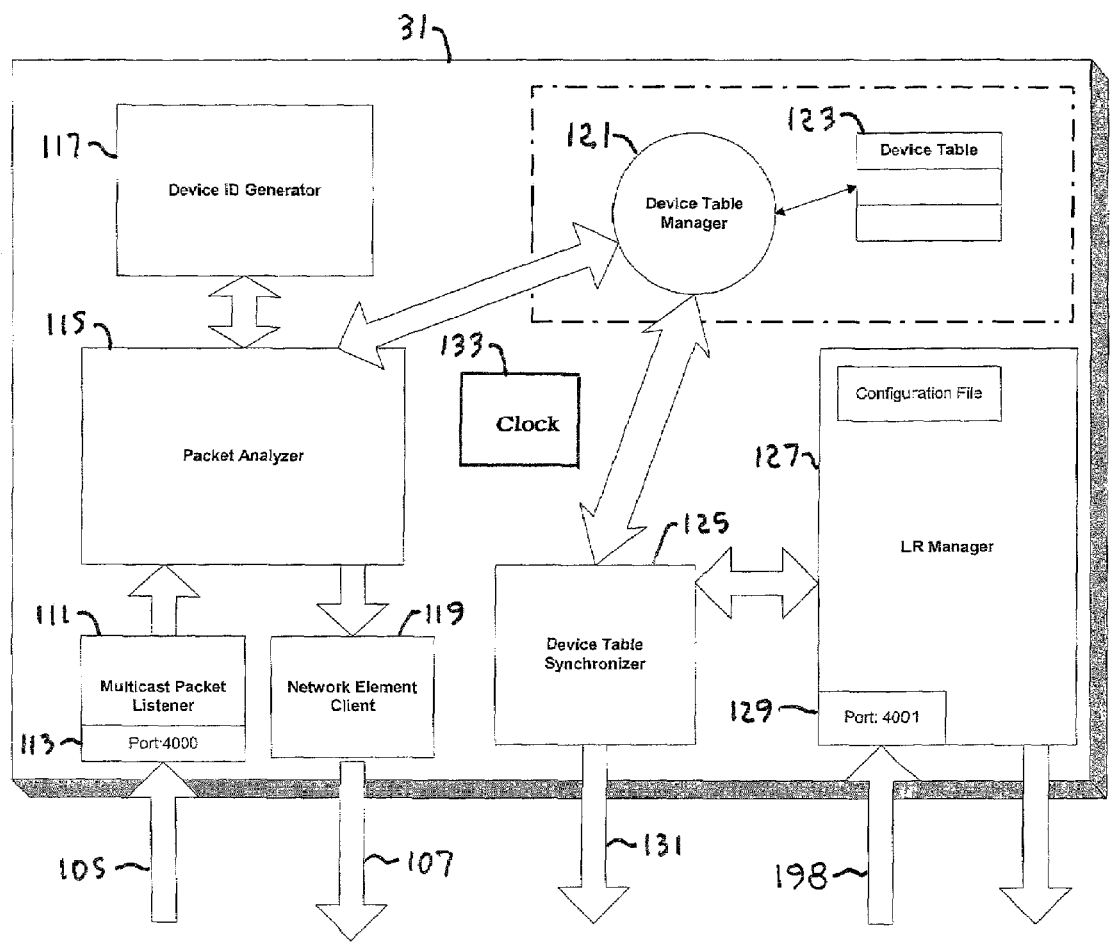
FIG. 3 is a functional block diagram of a local register host including a multicast packet listener and a network element client used in communicating with the network element of FIG. 2.
Figure 4:
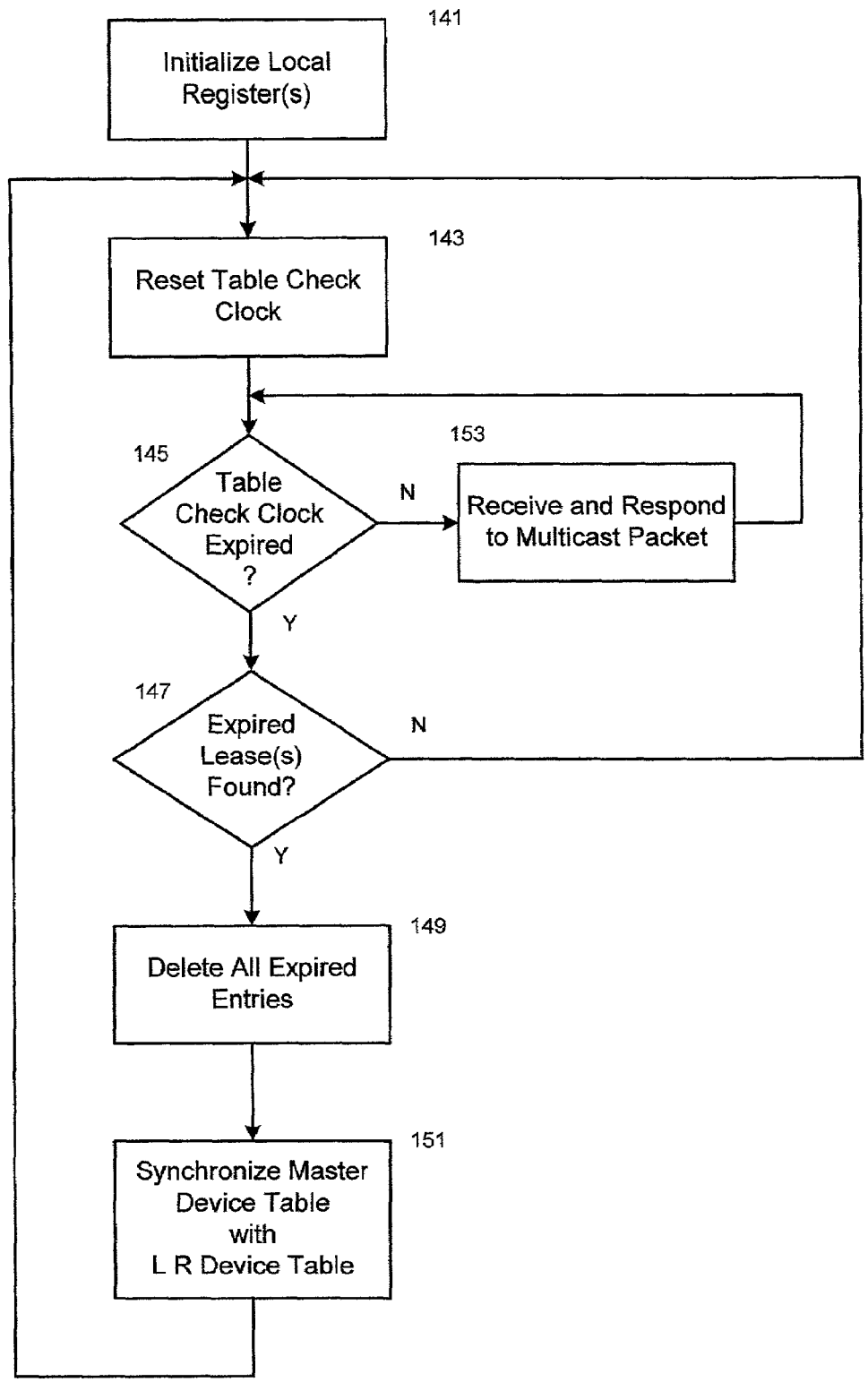
FIG. 4 is a flow diagram illustrating the operations performed by the local register host of FIG. 3.

The local register host 31 is an application having application components as shown in the functional block diagram of FIG. 3 and operating in accordance with the flow chart of FIG. 4. At startup, the first local register host 31 is initialized, at step 141. If the second local register host 33 is also present, the local register hosts 31 and 33 are initialized and synchronized with one another, at step 141. A table check clock 133 is reset, at step 143, as explained in greater detail below. A query is made, at decision block 145, as to whether the table check clock 133 time interval has expired. If the table check clock 133 time interval has not expired, the local register host 31 listens for and responds to a multicast, at step 153, as described in greater detail below, and then returns to decision block 145.

If the table check clock 133 time period has expired, at decision block 145, operation proceeds to decision block 147 at which a query is made as to whether a database for the subnet 20 listing managed network elements, the database herein denoted as a device table 123, includes an expired lease time, as explained in greater detail below. If no entry with an expired lease time is found, operation returns to decision block 145. If one or more entries with expired lease times are found, the corresponding entries are deleted, at step 149, and the device table 123 is synchronized with a central network database, herein denoted as a master device table 197 (shown in FIG. 6) in the device discovery system 190, at step 151. Operation then returns to step 143 at which the table check clock 133 is reset.

Figure 5:
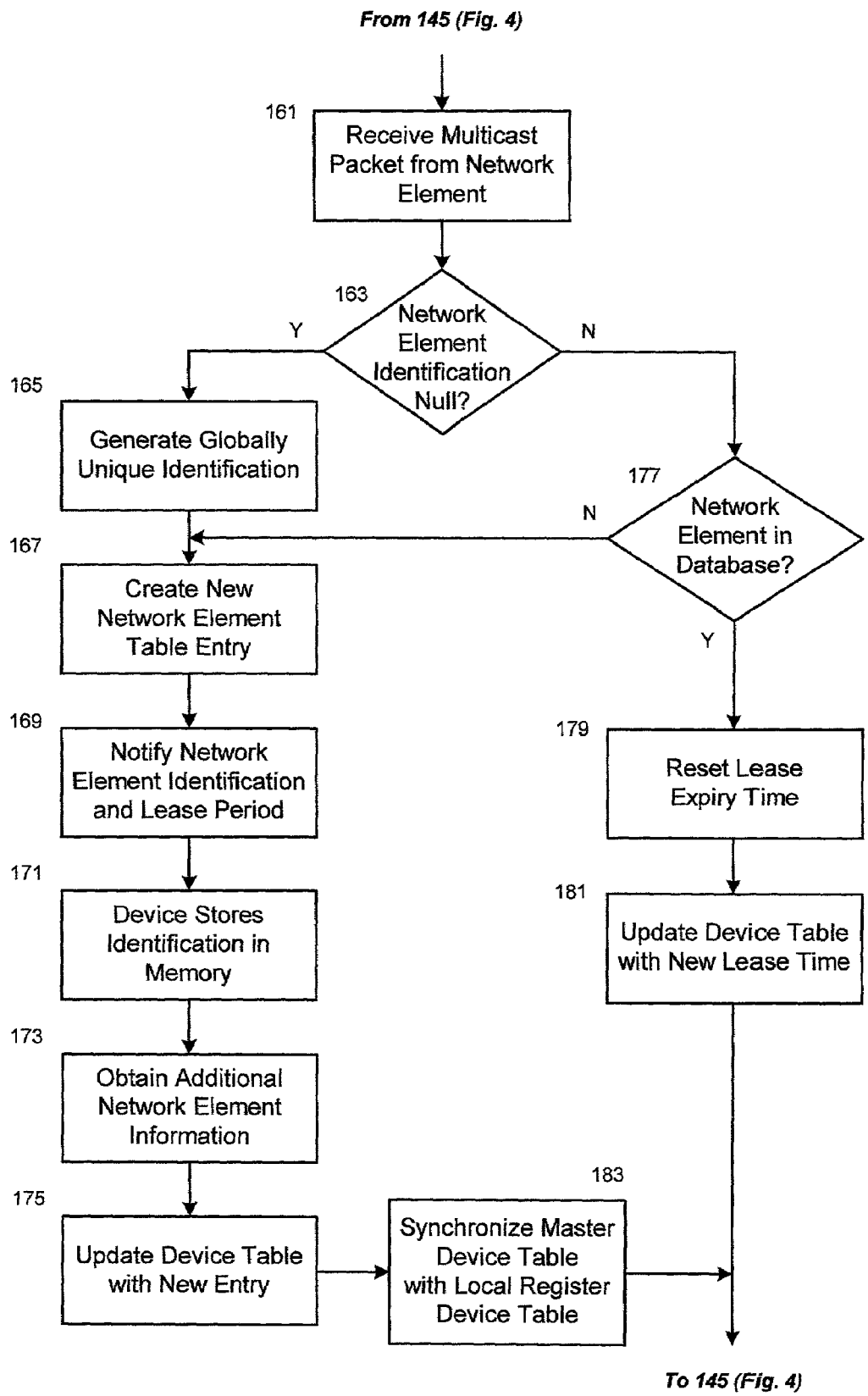
FIG. 5 is a flow diagram illustrating an operation of responding to multicast packets performed by the local register host of FIG. 3.

FIG. 5 is a flow chart of a sequence of operations performed at step 153 of FIG. 4. In FIG. 5, the multicast packets 105, transmitted by the network element 21, are received by a multicast packet listener 111, in FIG. 3, via a communication port 113, at step 161. A packet analyzer 115 receives notification from the multicast packet listener 111 when one of the multicast packets 105 is received. The multicast packet listener 111 provides the identification, the IP address, and the port number of the network element 21, along with a lease expire time, to the packet analyzer 115.

The packet analyzer 115 then checks the network element identification provided to determine if the identification is 'null,' at decision block 163. If the identification is not 'null,' operation proceeds to decision block 177. If the identification is 'null,' a globally unique identification is generated by a device identification generator 117, at step 165, and assigned to the network element 21. A device table manager 121, implemented as a software component, creates a new entry in the device table 123 for the network element 21, at step 167. The new entry includes a network element identification, the corresponding IP address, and a port number as provided by the multicast packet listener 111. Additionally, a lease expiry time is computed for the new entry by adding a configurable lease period to the current time.

In a preferred embodiment, the device table 123 comprises a fast, in memory database, which lists known network elements with the following entries:
Network Element Identification
IP Address
Port Number
Lease Expire Time
System Name
System Description
System Location
Uptime The device table manager 121 handles all requests for data access from the device table 123. In addition, the device table manager 121 periodically performs housekeeping functions by checking for and deleting entries in the device table 123 for which the respective Lease Expire Time have elapsed (i.e., are earlier than current time). The housekeeping functions are performed at intervals determined by the table check clock 133 and is configurable by the system manager.

The packet analyzer 115 requests a network element client 119, a management software component, to obtain the additional information to be entered in the device table 123 for the network element 21. The network element client 119 opens a unicast TCP socket connection to the network element 21, notifies the network element identification and lease period, at step 169, and sends the query 107 by using the IP address and the port number of the communication port 109, as provided by the packet analyzer 115. The network element 21 stores the identification in memory, at step 171. The network element client 119 then acquires the System Name, the System Description, the System Location, and the Uptime data for entry into the device table 123 for the network element 21, at step 173. The packet analyzer 115 requests the device table manager 121 to update the new entry in the device table 123 with the additional data, at step 175. The master device table 197 is synchronized with the device table 123 by updating with the new entry, at step 183. Operation then proceeds to step 145 where the status of the table check clock 133 is checked.

If the network element identification is not 'null,' at step 163, a query is made at decision block 177 as to whether the network element 21 is listed in the device table 123. If the network element 21 is not listed, operation proceeds to step 167 where a new entry is created for the network element 21. If the network element 21 is listed in the device table 123, the lease expiry time is reset, at step 179, by adding the lease period to the current time. A request is then made to the device table manager 121 to update the Lease Expire Time value for the network element 21 in the device table 123, at step 181, and operation returns to decision block 145.

The local register host 31 also includes a local register manager 127 which functions to initiate operation of the other components in the local register host 31 under separate threads of execution. A device table synchronizer 125 synchronizes the device table 123 with the master device table 197 in the device discovery system 190 resident in the central management station 13, shown in FIG. 6, by sending a synchronization data packet 131 when an entry has been added to or deleted from the device table 123.

Figure 6:
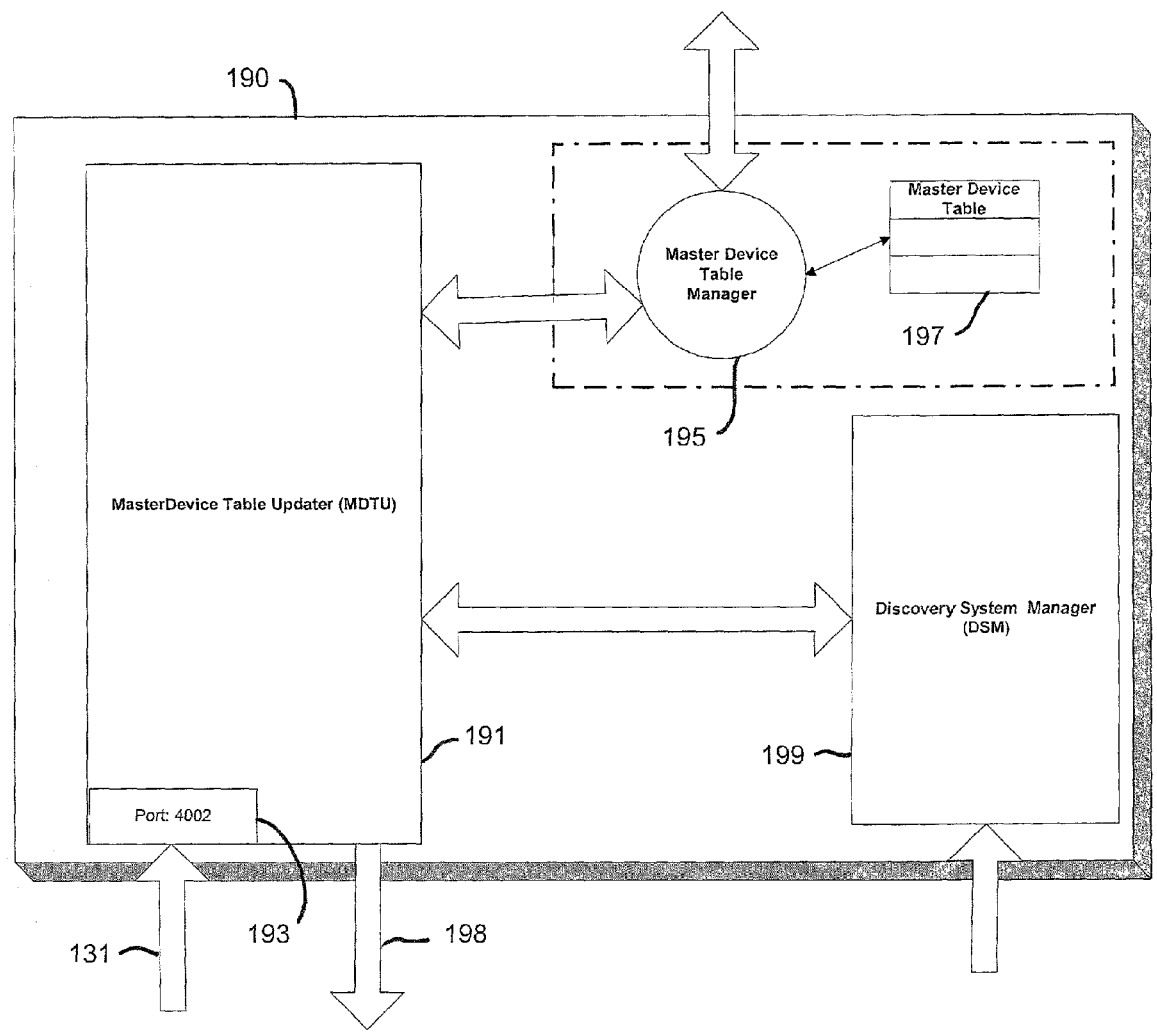
FIG. 6 is a functional block diagram of a device discovery system resident in the central management station of FIG. 1.

The synchronization data packet 131 is received by a master device table updater 191, implemented as a software component, via a communication port 193, as shown in FIG. 6. The master device table updater 191 provides read/write access to the master device table 197 for other components of the device discovery system 190. In addition, the master device table updater 191 provides an API for read-only access to the master device table 197 for other subsystems of the central management station 13. The master device table updater 191 operates as a server to the device table synchronizers of the respective local register hosts 31, 33, 51, 53, 71, and 73 in the network 10 (e.g., device table synchronizer 125 for local register host 31). The master device table 197 includes all the unique entries of the local register hosts 31, 33, 51, 53, 71, and 73 in the network 10. In a preferred embodiment, the master device table 197 comprises a fault-tolerant database and is cached in-memory for optimal operational performance.

The discovery system manager 199 functions to initialize the components of the device discovery system 190 in separate threads of execution. In addition, the discovery system manager 199 knows the IP addresses of the local register databases (i.e., device tables) in the local register hosts 31, 33, 51, 53, 71, and 73. After initializing, the discovery system manager 199 issues a request to the local register hosts 31, 33, 51, 53, 71, and 73 to upload the respective device tables. The discovery system manager 199 issues the request as a TCP unicast request 188 to the local register manager of the respective local register host (e.g., local register manager 127 for the local register host 31, in FIG. 3).

Figure 7:
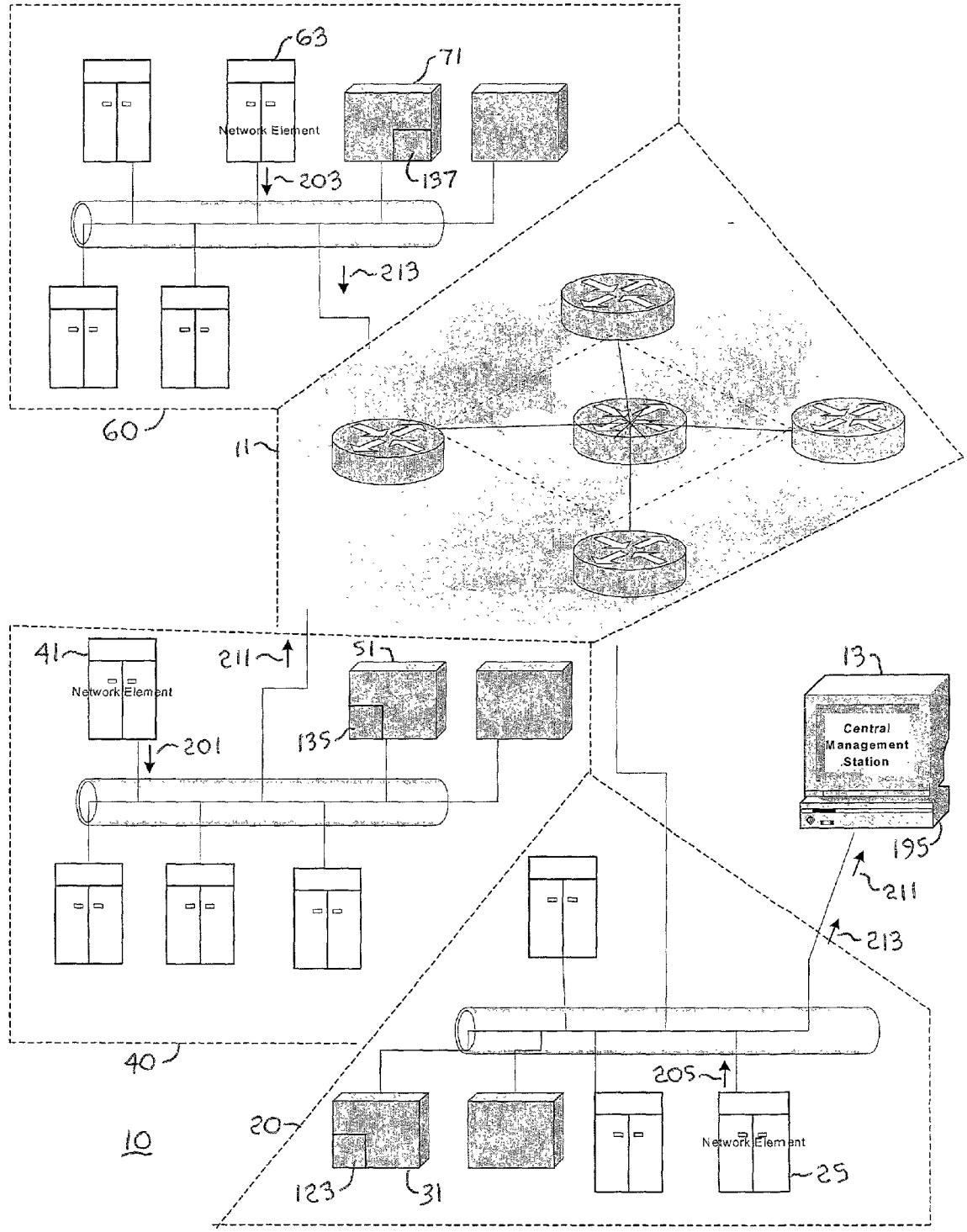
FIG. 7 is a simplified functional diagram of the network of FIG. 1 illustrating the synchronization of device tables in the local register hosts with a master device table in the central management station.

With the foregoing in mind, the general method by which the central management station 13 locates and monitors the network elements 21–25, 41–47, and 61–67 can be explained by the following examples, with reference to the simplified block diagram of FIG. 7. In a first example, a multicast packet 205 is issued by the network element 25 in the subnet 20. The local register host 31 receives the multicast packet 205 and determines that the network element 25 is listed in the device table 123. The lease time entry for network element 25 is reset, by which the device table 123 is updated in accordance with the flow diagram of FIG. 5. It can be appreciated by one skilled in the relevant art that the action of updating the device table 123 with the reset lease time for the network element 25 does not necessitate a subsequent synchronization of the master device table 197 with the device table 123.

In a second example, a multicast packet 201 is issued by the network element 41 which has just come 'on line' in the subnet 40. The local register host 51 receives the multicast packet 201 and determines that the network element 41 is not listed in a device table 135, which is a database for the subnet 40. An entry is created for the network element 41 in the device table 135 in accordance with the flow diagram of FIG. 5. This action necessitates a subsequent synchronization of the master device table 197 with the device table 135. Accordingly, the local register host 51 transmits a master device table entry, here denoted as a synchronization data packet 211, to the master device table manager 195 in the central register station 13 via the communication network 11 to perform the synchronization.

In a third example, the lease time for the network element 63 has expired since a multicast packet 203 was last issued by the network element 63 in the subnet 60. The network element 63 is considered to be a non-issuing network element indicating that the network element 63 may have failed or may have been moved to another location within the network 10. The local register host 71 detects the expired lease period in a local register database, here denoted as a device database 137. The corresponding entry for the non-issuing network element 63 is subsequently deleted from the device database 137 in accordance with the flow diagram of FIG. 5. This action necessitates a subsequent synchronization of the master device table 197 with the device table 137. Accordingly, the local register host 71 transmits a synchronization data packet 213 to the master device table manager 195 in the central register station 13 via the communication network 11 to perform the synchronization by deleting the corresponding entry in the master device table 197.

It can further be appreciated by one skilled in the relevant art that the local register hosts 31, 51, and 71 thus function as filters in keeping multicast packets confined to the respective subnets 20, 40, and 60, while transmitting only updated information (i.e., deletions and new entries) to the central management station 13.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A method for discovering network elements in a network having a plurality of subnets, each network element periodically issuing a unique multicast packet within its subnet, said method comprising the steps of:
   receiving a multicast packet from an issuing network element;
   deriving an identification for said issuing network element from information included within said received multicast packet;
   searching a subnet database for a table entry corresponding to said issuing network element identification;
   adding said issuing network element identification to said subnet database if no corresponding said table entry is found in said subnet database; and
   synchronizing a network database with said subnet databases,
   wherein the multicast packet comprises an element from the group consisting of the identification of the issuing network element, an internet protocol address, and a port number.

2. The method of claim 1 wherein said step of synchronizing said network database comprises the step of adding an entry to said network database.

3. The method of claim 1 wherein the identification of the issuing network element comprises either a null value or a globally-unique identification.

4. The method of claim 1 wherein said table entry comprises a member of the group consisting of a network element identification, an internet protocol address, a port number, and a lease expire time.

5. The method of claim 4 further comprising the steps of:
   deleting said table entry if said lease expire time is less than current time; and
   synchronizing said network database with said subnet database if said table entry is deleted from said subnet database.

6. The method of claim 5 wherein said step of synchronizing said network database comprises the step of deleting an entry from said network database.

7. The method of claim 1 wherein said step of deriving the identification for said issuing network element comprises the step of assigning a globally-unique identification to said issuing network element if said multicast packet comprises a null value.

8. The method of claim 1 further comprising the step of updating a lease period if a corresponding said table entry is found in said subnet database.

9. A system for managing network elements in a network having a plurality of subnets, said system comprising:

a multicast packet sender resident in each network element to be discovered, said multicast packet sender for periodically issuing a unique multicast packet within a subnet corresponding to the multicast packet sender;

at least one local register host in each subnet for receiving said multicast packet and for generating a synchronization data packet therefrom; and a central management station in communication with each subnet, said central management station for receiving said synchronization data packet from said at least one local register host, such that the presence of a particular functioning network element is conveyed to said central management station with the receipt of a respective said synchronization data packet.

10. The system of claim 9 wherein said multicast packet comprises an element from the group consisting of an identification, an internet protocol address, and a port number.

11. The system of claim 9 wherein said at least one local register host includes a multicast packet listener for receiving said multicast packets and producing therefrom at least one member of the group consisting of an identification, an internet protocol address, a port number, a null value, and a globally-unique identification.

12. The system of claim 10 wherein said at least one local register host includes a packet analyzer for determining whether said identification comprises a null value.

13. The system of claim 12 wherein said at least one local register host includes a device identification generator for assigning a globally-unique identification to said identification.

14. The system of claim 9 wherein said at least one local register host includes a network element client for sending a query to any of the network elements in a common subnet.

15. The system of claim 14 wherein said system further comprises a management agent resident in each network element in said common subset, each said management agent for receiving said query and providing requested information in response thereto.

16. The system of claim 9 wherein said at least one local register host includes a device table having entries for the network elements to be managed.

17. The system of claim 16 wherein said at least one local register host includes a device table manager for handling requests for data access from said device table.

18. The system of claim 16 wherein said at least one local register host includes a device table synchronizer for sending at least one said synchronization data packet to said central management station in response to either an addition of an entry to or a deletion of an entry from said device table.

19. The system of claim 9 wherein said central management station includes a master device table updater for receiving said synchronization data packets.

20. A program storage device readable by a computer for performing a method for discovering network elements in a network having a plurality of subnets, said method comprising the steps of:

receiving multicast packets within a respective subnet, each said received multicast packet including an identification associated with the network element issuing said multicast packet;

sending a new network element entry including said identification to a network database if said network element issuing said multicast packet is not listed in a subnet database; and deleting a corresponding network database entry for a non-issuing network element if no multicast packet received from said non-issuing network element within a predefined table check time interval.

21. The program storage device of claim 20 wherein said method further comprises the step of requesting information from the network element issuing said multicast packet.

22. The program storage device of claim 20 wherein said method further comprises the step of assigning a globally-unique identification to the network element issuing said multicast packet if said identification included in said multicast packet is a null identification.

23. The program storage device of claim 20 further comprising the step of updating a lease period if a corresponding said table entry is listed in said subnet database.

* * * * *